United States Patent
Subramanian

(10) Patent No.: US 10,019,397 B2
(45) Date of Patent: Jul. 10, 2018

(54) REAL-TIME DATA ACQUISITION USING CHAINED DIRECT MEMORY ACCESS (DMA) CHANNELS

(71) Applicant: Texas Instruments Incorporated, Dallas, TX (US)

(72) Inventor: Sreeram Subramanian, Bangalore (IN)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 390 days.

(21) Appl. No.: 14/659,602

(22) Filed: Mar. 16, 2015

(65) Prior Publication Data

US 2015/0278133 A1    Oct. 1, 2015

Related U.S. Application Data

(60) Provisional application No. 61/971,882, filed on Mar. 28, 2014.

(51) Int. Cl.
*G06F 13/36* (2006.01)
*G06F 13/28* (2006.01)
*G06F 13/42* (2006.01)

(52) U.S. Cl.
CPC .......... *G06F 13/28* (2013.01); *G06F 13/4282* (2013.01)

(58) Field of Classification Search
CPC ..................................................... G06F 13/28
USPC ...................................................... 710/308
See application file for complete search history.

(56) References Cited

U.S. PATENT DOCUMENTS

| | | | | |
|---|---|---|---|---|
| 4,716,523 A | * | 12/1987 | Burrus, Jr. .............. | G06F 13/34 710/261 |
| 5,113,522 A | * | 5/1992 | Dinwiddie, Jr. ..... | G06F 11/1641 713/2 |
| 5,283,638 A | * | 2/1994 | Engberg ............... | H04M 11/066 348/14.01 |
| 5,335,329 A | * | 8/1994 | Cox .................... | G06F 13/1668 710/25 |
| 5,513,325 A | * | 4/1996 | Harris, Jr. ............. | G06F 13/387 709/249 |
| 5,535,362 A | * | 7/1996 | Ami ...................... | G06F 13/362 710/22 |
| 5,642,489 A | * | 6/1997 | Bland .................... | G06F 1/3225 710/22 |
| 5,765,023 A | * | 6/1998 | Leger ..................... | G06F 13/28 710/22 |
| 5,909,559 A | * | 6/1999 | So ........................ | G06F 13/4018 710/307 |

(Continued)

OTHER PUBLICATIONS

Vectoed I/O, also known as Scatter gather I/O from Wikipedia 7, Jun. 2010.*

(Continued)

*Primary Examiner* — Paul R Myers
(74) *Attorney, Agent, or Firm* — Michael A. Davis, Jr.; Charles A. Brill; Frank D. Cimino

(57) ABSTRACT

A method for real-time data acquisition in a processing component using chained direct memory access (DMA) channels that includes receiving a DMA event signal in a DMA controller of the processing component, and executing, responsive to the DMA event signal, a plurality of DMAs to read at least one data sample from a peripheral device, in which a last DMA in the plurality of DMAs performs a write operation to acknowledge completion of the DMA event.

25 Claims, 3 Drawing Sheets

(56) References Cited

U.S. PATENT DOCUMENTS

| | | | |
|---|---|---|---|
| 5,928,339 A | 7/1999 | Nishikawa | |
| 5,974,478 A | 10/1999 | Wood | |
| 7,330,914 B2 | 2/2008 | Inogai | |
| 8,041,847 B1* | 10/2011 | Smith | G06F 13/28 710/22 |
| 2001/0016883 A1* | 8/2001 | Mino | G06F 13/28 710/27 |
| 2004/0049632 A1* | 3/2004 | Chang | G06F 11/1076 711/114 |
| 2005/0262276 A1* | 11/2005 | Singh | G06F 13/28 710/22 |
| 2006/0031600 A1* | 2/2006 | Ellis | G06F 13/28 710/22 |
| 2010/0057950 A1* | 3/2010 | Barrow | G06F 13/28 710/22 |
| 2010/0064070 A1* | 3/2010 | Yoshimura | G06F 13/128 710/22 |

OTHER PUBLICATIONS

Structured Computer Organization thired Edition Andrew S. Tanenbaum 1990.*

Pascal Nelson, "Texas Instruments DLP Technology for Spectroscopy", DLPA048, Texas Instruments Incorporated, Feb. 2014, pp. 1-8.

"Sitara Processors", Texas Instruments Incorporated, SPRT674A, 2014, pp. 1-7.

"AM335x Sitara Processors Technical Reference Manual", Texas Instruments Incorporated, Literature No. SPRUH73K, Oct. 2011, Revised Jun. 2014, pp. 1-1000.

"AM335x Sitara Processors Technical Reference Manual", Texas Instruments Incorporated, Literature No. SPRUH73K, Oct. 2011, Revised Jun. 2014, pp. 1001-2000.

"AM335x Sitara Processors Technical Reference Manual", Texas Instruments Incorporated, Literature No. SPRUH73K, Oct. 2011, Revised Jun. 2014, pp. 2001-3000.

"AM335x Sitara Processors Technical Reference Manual", Texas Instruments Incorporated, Literature No. SPRUH73K, Oct. 2011, Revised Jun. 2014, pp. 3001-4000.

"AM335x Sitara Processors Technical Reference Manual", Texas Instruments Incorporated, Literature No. SPRUH73K, Oct. 2011, Revised Jun. 2014, pp. 4001-4966.

* cited by examiner

| ADC SAMPLES | PATTERN MARKER SAMPLES | |
|---|---|---|
| SAMPLE1 | 0 | |
| SAMPLE2 | 1 | |
| SAMPLE3 | 1 | PATTERN 0 |
| ○○○ | ○○○ | |
| SAMPLE10 | 1 | |
| SAMPLE11 | 0 | ← ZEROS DELINEATE PATTERNS |
| SAMPLE12 | 1 | |
| SAMPLE13 | 1 | |
| ○○○ | 1 | PATTERN 1 |
| SAMPLE35 | 1 | |
| SAMPLE36 | 0 | |
| SAMPLE378 | 1 | PATTERN 2 |

REAL-TIME DATA ACQUISITION USING CHAINED DIRECT MEMORY ACCESS (DMA) CHANNELS

CROSS-REFERENCE TO RELATED APPLICATIONS

This application claims benefit of U.S. Provisional Patent Application Ser. No. 61/971,882, filed Mar. 28, 2014, which is incorporated herein by reference in its entirety.

BACKGROUND OF THE DISCLOSURE

Field of the Disclosure

Embodiments of the present disclosure generally relate to real-time data acquisition, and more specifically relates to real-time data acquisition using chained direct memory access (DMA) channels.

Description of the Related Art

In many embedded system applications, the acquisition of data from an analog-to-digital converter (ADC) or similar device via a peripheral such as a serial port interface (SPI) is performed in synchronization with an external event. In some applications, a dedicated processor such as a microcontroller or a digital signal processor is used for the data acquisition to achieve real-time performance. In other applications, the data acquisition is software-based and executes on a processor that is also executing the operating system and performing other tasks. In such applications, the data acquisition is typically interrupt driven, and as such, the performance is non-deterministic due to varying interrupt latencies caused by factors such as other tasks/servers/services executing in the system, drivers that may disable interrupts, and the speed of the processor.

SUMMARY

Embodiments of the present disclosure relate to methods and apparatus for real-time data acquisition using chained direct memory access (DMA) channels. In one aspect, a method for real-time data acquisition in a processing component using chained direct memory access (DMA) channels that includes receiving a DMA event signal in a DMA controller of the processing component, and executing, responsive to the DMA event signal, a plurality of DMAs to read at least one data sample from a peripheral device, in which a last DMA in the plurality of DMAs performs a write operation to acknowledge completion of the DMA event.

In one aspect, a system is provided that includes a first peripheral device, and a processing component having a direct memory access (DMA) controller and a first peripheral interface, in which the first peripheral interface is coupled to the first peripheral device to receive a signal indicating a DMA event is to be triggered, and in which the DMA controller is coupled to the first peripheral interface to receive the DMA event, in which a plurality of DMAs is executed responsive to the DMA event to read at least one data sample from the first peripheral device, in which a last DMA in the plurality of DMAs performs a write operation to acknowledge completion of the DMA event.

In one aspect, an apparatus is provided that includes a plurality of chained direct memory access (DMA) channels in which a last DMA channel in the plurality of chained DMA channels is programmed to perform a write to acknowledge a DMA event that causes the plurality of chained DMA channels to be executed, a DMA controller configured to cause execution of the chained DMA channels in response to the DMA event, and a peripheral device coupled to the DMA controller to signal the DMA event.

BRIEF DESCRIPTION OF THE DRAWINGS

Particular embodiments will now be described, by way of example only, and with reference to the accompanying drawings.

DETAILED DESCRIPTION OF EMBODIMENTS OF THE DISCLOSURE

Figure 1:
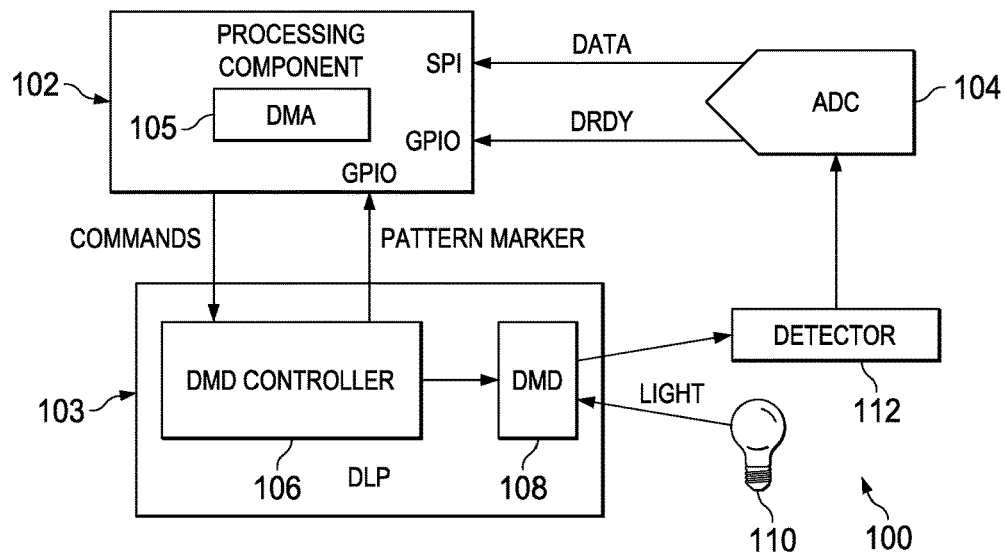
FIG. 1 is a simplified block diagram of an example system configured to perform a method for real-time data acquisition using chained direct memory access (DMA) channels.

Specific embodiments of the disclosure will now be described in detail with reference to the accompanying figures. Like elements in the various figures are denoted by like reference numerals for consistency.

Embodiments of the disclosure provide for real-time data acquisition in a microprocessor from an analog-to-digital converter (ADC) or similar peripheral device in synchronization with an external event without interrupting the processor. In embodiments, real-time data acquisition using direct memory access (DMA) is extended to peripheral devices that need explicit acknowledgement of completion of a DMA event in order to generate a subsequent DMA event. More specifically, a set of DMA channels are used to acquire data in response to a DMA event without interrupting the processor and without software intervention. A final DMA in the set performs a write to acknowledge completion of the DMA event processing. As used herein, a set of DMA channels is two or more DMAs that are completed in response to a single DMA event. The final DMA in the set is required to be chained to an immediately previous DMA in the set but other DMAs in the set may or may not be chained.

FIG. 1 is a simplified block diagram of the hardware architecture of an example system 100 configured to perform a method for real-time data acquisition using DMA channels. In the example system 100, the data acquisition is performed in synchronization with an external event. The depicted example system 100 is a spectroscopy development platform based on a near infrared (NIR) digital light processing (DLP) device 103. The use of DLP technology for spectroscopy is described, for example, in Pascal Nelson, "Texas Instruments DLP® Technology for Spectroscopy," Texas Instruments, February 2014, pp. 1-8, which is incorporated by reference herein. In addition to the DLP device 103, the system 100 includes a processing component 102, an analog-to-digital converter (ADC) 104, a detector 112, and a light source 110.

The DLP device 103 includes a digital micromirror device (DMD) 108 coupled to a DMD controller 106 with an integrated micromirror driver. The DMD 108 is an array of highly reflective micromirrors with an underlying memory cell. The DMD controller 106 provides high speed control of the DMD 108 to change the positions of the micromirrors in the DMD 108 to project differing patterns. The particular patterns are designed to reflect light wavelengths in the IR/NIR wavelength region. In some embodiments, the DMD controller 106 reads the patterns from flash memory (not shown). In some embodiments, the processing component 102 streams the patterns to the DMD controller 106 over a parallel RGB interface (not shown).

The DMD controller 106 outputs trigger signals, i.e., synchronization signals, which may be used for synchronizing patterns displayed on the DMD 108 with corresponding samples from the analog-to-digital converter (ADC) 104. One trigger signal indicates the display of the first pattern in a sequence of patterns and the other signal is high during each the exposure of each pattern. In some embodiments, the DLP device 103 is the DLP4500NIR chipset available from Texas Instruments, Inc. which is optimized for the near infrared range.

The processing component 102 is coupled to the DMD controller 106 via a general purpose input/output (GPIO) interface to receive the trigger signals and via an inter-integrated circuit (I2C) bus or USB interface (not shown) to send commands to the DMD controller 106. The trigger signal indicating the exposure of each pattern in a sequence of patterns is referred to as a pattern marker herein. Commands that the processing component 102 may send to the DMD controller 106 include, for example, a command to configure trigger signals, a command to set the source of the patterns to be displayed, e.g., flash memory or RGB interface, commands to start and stop pattern display, and commands to set pattern exposure times.

The processing component 102 is also coupled to the ADC 104 via a GPIO interface to receive data ready (DRDY) signals and via a serial port interface (SPI) to receive data samples. The DRDY signal goes low each time the ADC 104 has a sample ready. Further, during system operation, the ADC 104 is configured in a free running mode in which the ADC 104 continuously converts analog input to digital samples at the rate of 30,000 samples per second. As is described in further detail herein in reference to FIG. 3, the data acquisition from the ADC 104 is handled by the direct memory access (DMA) controller 105 in the processing component 102 that is coupled to the DRDY signal of the ADC 104 via the GPIO interface. More specifically, the DRDY signal is coupled to the GPIO interface cause an event to be signaled to the DMA controller 105 when a sample is ready. This event is referred to as a DMA event herein.

The processing component 102 may be any suitable processor. An example of a suitable processor is described in reference to FIG. 2. The DMA controller 105 may be any suitable DMA controller or engine that provides chaining of DMA channels. As is well known, DMA channel chaining allows the completion of a DMA channel transfer to trigger a subsequent DMA channel transfer, thus permitting several DMAs to be performed in response to one DMA event. Chaining may be achieved, for example, at final transfer completion of the current DMA channel, or, in some DMA controllers, at intermediate transfer completion, final transfer completion, or both, of the current channel.

The light source 110, which is optically coupled to the DMD 108, provides light that is reflected by patterns on the DMD 108. The light source 110 may be, for example, a halogen lamp. The detector 112, which is optically coupled to the DMD 108, is arranged to detect the light patterns reflected by the DMD 108 and convert the light energy to equivalent voltage. The detector 112 may be, for example, a single-element extended InGaAs (indium gallium arsenide) detector. The detector 112 is coupled to the ADC 104 to provide analog voltage samples corresponding to detected light patterns.

A general description of the operation of the system 100 is now provided. A more detailed description is provided in reference to FIG. 3. The processing component 102 sends a command to the DMD controller 106 to initiate the projection of a sequence of patterns. The DMD controller 106 accesses the sequence of patterns and causes the micromirrors in the DMD 106 to be arranged to project each pattern in turn. The DMD controller 106 also sends a pattern marker to the processing component 102 via the GPIO interface when each pattern is displayed.

The detector 112 detects the light patterns, converts the light energy to voltage, and provides the analog voltages to the ADC 104. The ADC 104 converts the analog voltages to digital voltages and signals the processing component 102 via the DRDY signal when each sample is ready. The DRDY signal causes the GPIO interface to trigger a DMA event. Responsive to this event, the DMA controller 105 triggers a set of DMAs. Individual DMAs in the set read the sample from the ADC 104 via the SPI, read the current pattern marker from the GPIO interface, and store the samples and pattern markers in memory. The final DMA in the group, which is chained to the immediately previous DMA, performs a write to the GPIO interface to acknowledge that the DMA event has been completed. This acknowledgement allows the next DMA event for data acquisition from the ADC 104 to be triggered.

Figure 2:
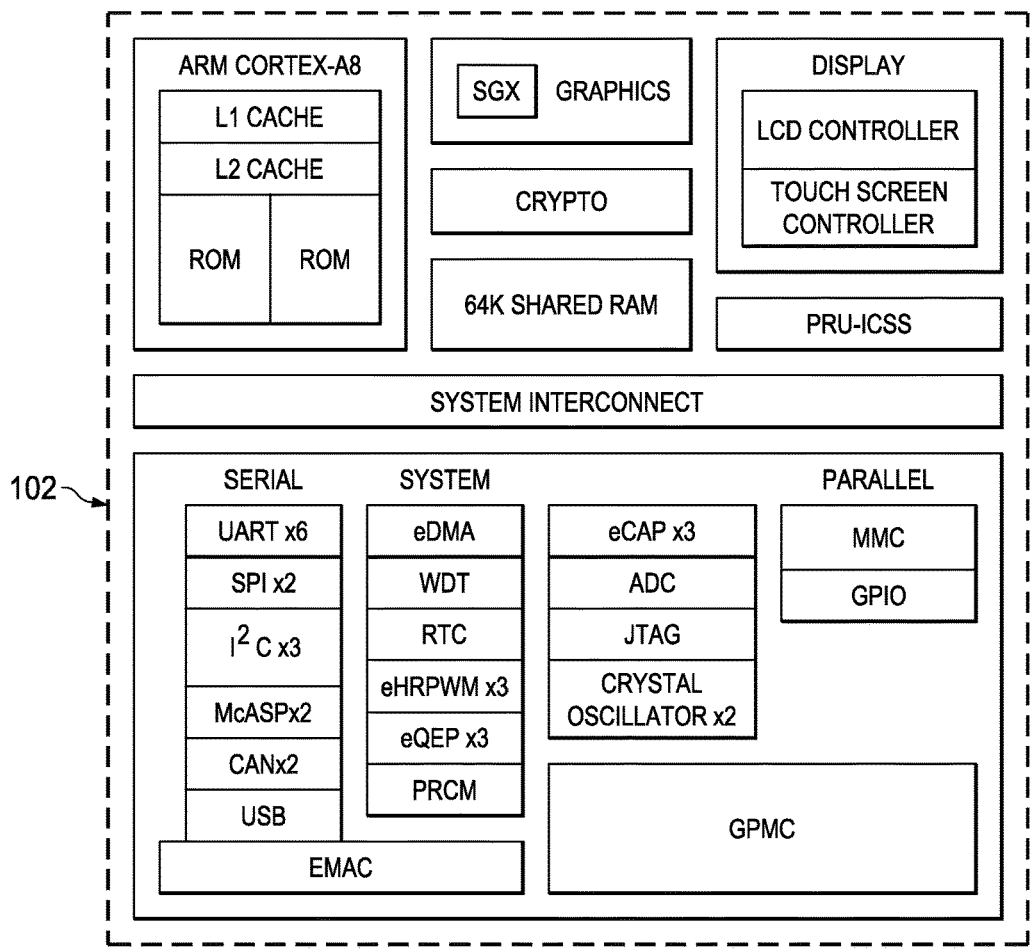
FIG. 2 is a simplified block diagram of a processor suitable for use as the processing component of the example system of FIG. 1.

FIG. 2 is a simplified block diagram illustrating the high level architecture of a processor 102, i.e., a system-on-a chip (SoC), suitable for use as the processing component 102 of FIG. 1. In particular, the processor architecture is representative of the AM335x Sitara™ family of processors available from Texas Instruments, Inc. The architecture is described in more detail in "AM335x Sitara™ Processors Technical Reference Manual," SPRUH73K, October 2011—revised June 2014, which is incorporated by reference herein.

The SoC 200 is a system solution optimized for use in embedded applications requiring flexible real-time processing. The architecture is based on based on an ARM® Cortex®-A8 based multiprocessor unit (MPU) subsystem, a programmable real-time unit and industrial communication subsystem (PRU-ICSS). The MPU includes an ARM® Cortex®-A8 processor, a 32 KB L1 instruction and data cache, a 256 KB L2 cache, 176K of read only memory (ROM) and 64K of random access memory (RAM).

The PRU-ICSS includes dual 32-bit reduced instruction set computer (RISC) cores referred to as programmable real-time units (PRUs), 8 KB of shared data memory and 8 KB of shared instruction memory, internal peripheral modules, and an interrupt controller. The programmable nature of the PRU, along with its access to pins, events and all SoC resources, provides flexibility in implementing fast real-time responses, specialized data handling operations, custom peripheral interfaces, and in offloading tasks from the other processor cores of the SOC 200. The PRU-ICSS also includes an enhanced capture module (ECAP), an industrial Ethernet peripheral (IEP), and a universal asynchronous receiver/transmitter (UART).

The SoC 1300 also includes on-chip shared memory, a graphics accelerator (SGX), an LCD controller, a touch screen controller, and an Ethernet media access controller (EMAC). Additional on-chip peripherals include an inter-integrated circuit (I2C) bus interface, multichannel audio serial ports (McASP), various timers including general-purpose timers, a watchdog timer (WDT), and a real-time clock (RTC), UART interfaces, pulse width modulators (eHRPWM), ECAP modules, controller area network (CAN) controllers, universal serial bus (USB) controllers, an enhanced quadrature encoder pulse (EQEP) module, a power and clock management (PRCM) module, a multimedia card (MMC) controller, a JTAG interface, and a general purpose memory controller (GPMC) for interfacing to external memory devices.

The SOC 102 further includes serial port interface (SPI) modules. These modules are general-purpose receive/transmit master/slave controllers that can interface with up to four slave external devices or one external master device. As previously mentioned in reference to FIG. 1, an SPI interface is used to receive samples from the ADC 104.

The SOC 102 also includes a general-purpose input/output (GPIO) interface with four GPIO modules each having 32 dedicated pins with input and output capabilities. These pins can be configured for data input and output and interrupt generation upon detection of external events, and wake-up request generation upon detection of signal transition(s). In addition, interrupt requests can be redirected as DMA requests in three of the four GPIO modules. Each GPIO module implements a set-and-clear protocol register update for the data output and interrupt enable registers. This protocol is an alternative to the atomic test and set operations and uses write operations to dedicated addresses (one address for setting bit(s) and one address for clearing bit(s)). The data to write is 1 at bit position(s) to be cleared (or to be set) and 0 at unaffected bit(s). These registers can be accessed either with full register read and write operation at a primary register address or with set and clear operations at separate register addresses provided to set and clear bits in the registers. Writing a 1 at bit positions at these addresses sets (or clears) the corresponding bits in the corresponding register while writing a 0 at bit positions has no effect. Thus, these physical registers each have three addresses.

One of the registers in each of the GPIO modules is an end of interrupt (EOI) register. This register must be written to after completion of the processing of a DMA event initiated via the GPIO module in order to permit subsequent DMA events to be triggered from the GPIO module. As previously mentioned in reference to FIG. 1, a GPIO interface is used to receive the DRDY signal from the ADC 104 and to receive the pattern marker from the DMD controller 106.

The SOC 200 also includes a DMA controller (EDMA). The DMA controller supports chaining of DMA channels. Chaining is a mechanism by which the completion of one transfer (DMA) automatically sets the event for another channel. A chain of DMA channels may be triggered by an external event. As previously mentioned in reference to FIG. 1, a set of DMAs is triggered when the DRDY signal from the ADC 104 goes low to read the samples from the ADC 104 and to read the current pattern marker from the GPIO interface.

Figure 3:
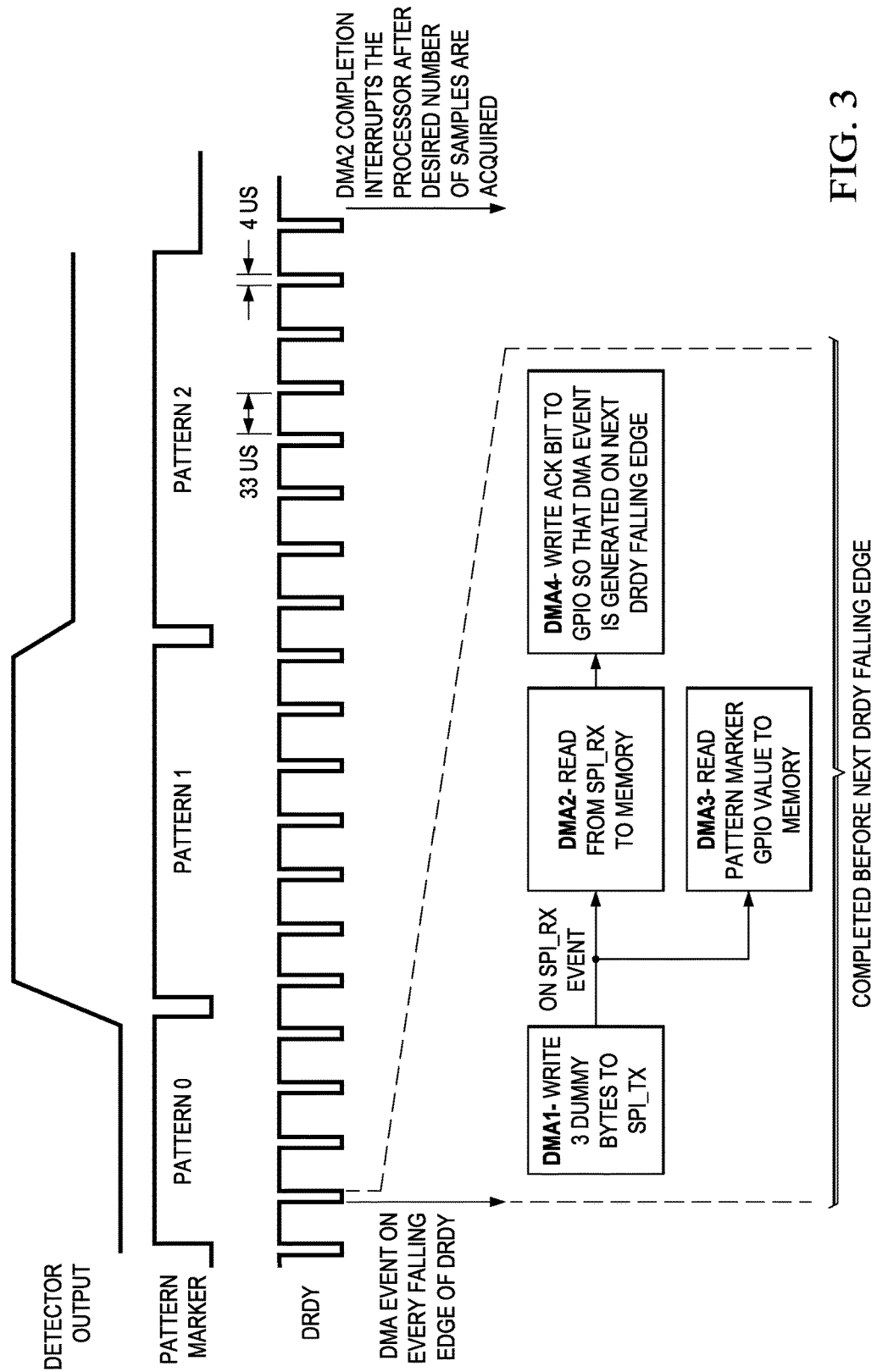
FIG. 3 is an example illustrating the operation of the example system of FIG. 1.

FIG. 3 is an example illustrating the operation of the example system of FIG. 1 in which an embodiment of a method for real-time data acquisition using chained DMA channels is performed. In describing this figure, the SOC 200 of FIG. 2 is assumed to be the processing component 102 in the example system 100. FIG. 3 shows example corresponding time waveforms for the output of the detector 112 as the patterns are changed on the DMD 108, the pattern marker signal from the DMD controller 106, and the DRDY signal from the ADC 104.

As the pattern marker waveform illustrates, the DMD controller 104 causes the pattern marker signal to go high when a new pattern is displayed on the DMD 106. The pattern marker signal remains high until the next pattern is to be displayed, at which time the DMD controller 104 causes the pattern marker signal to go low and then back to high to indicate the end of the current pattern and the beginning of a new pattern.

As the DRDY waveform illustrates, a DMA event occurs on every falling edge of the DRDY signal from the ADC 104. The DMA chain triggered in response to the DMA to acquire the sample from the ADC and pattern marker sample from the GPIO is required to complete before the next DRDY falling edge.

In this particular example, the DMA set includes four DMAs. The first DMA, DMA1, writes three dummy bytes to the SPI transmit register, SPI_TX, in order to enable a read from the SPI receive register, SPI_RX. This initial DMA is needed because the ADC 104 is coupled to the processing component 102 via an SPI interface for data acquisition. With an SPI interface, the processing component 102 is the master, and it is required to write a byte to the interface in order to read a byte. In this example, the ADC sample is three bytes, so a write of the 3 bytes to SPI interface is needed in order to read the three bytes of the sample. With the completion of DMA1, the SPI interface triggers the next two DMAs, DMA2 and DMA3, which may be performed concurrently. DMA2 reads the three byte sample from the SPI receive register, SPI_RX, and stores it in memory on the processing component 102. DMA3 reads the current pattern marker value from the GPIO interface and stores it in memory on the processing component 102. The completion of DMA2 triggers the fourth DMA, DMA4. DMA4 writes an acknowledgement (ACK) bit to the GPIO interface to indicate that the processing of the DMA event is complete. This write allows a DMA event to be generated on the next DRDY falling edge.

As is indicated in FIG. 3, completion of DMA2 interrupts the processing component 102 after a desired number of samples is acquired. For example, assume that each of the DMAs in the group of DMAs is programmed to handle N events. In the example system, the number of patterns and the corresponding number of ADC samples needed to scan an object determines the value of N. At the completion of processing of each DMA event, DMA2 triggers DMA4 to acknowledge the event. After N DMA events, DMA2 triggers an interrupt to signal that data acquisition is complete and the data is ready for processing.

Figures 4, 5:
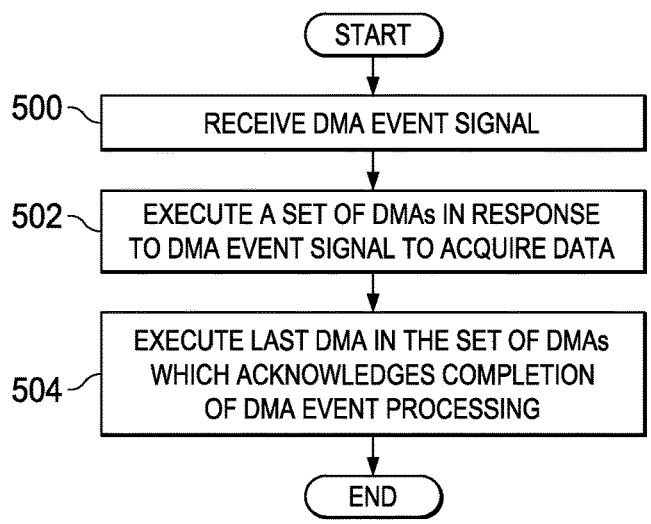
FIG. 4 illustrates the synchronization of pattern marker samples with analog-to-digital (ADC) samples in the example system of FIG. 1.
FIG. 5 is a flow diagram of a method for real-time data acquisition using chained DMA channels.

FIG. 4 illustrates the synchronization of the pattern marker samples with ADC samples. In this table, the zeros in the pattern marker column delineate the individual patterns. Thus, when the samples for the sequence of patterns are processed, which samples correspond to which patterns can be determined based on the values of the pattern makers corresponding to the samples.

FIG. 5 is a flow diagram of a method for real-time data acquisition using chained DMA channels. As shown in FIG. 5, initially a DMA event signal is received 500 by a DMA controller. In response to this event signal, the DMA controller triggers execution 502 of a set of pre-programmed DMAs to acquire and store the desired data. The particular data to be acquired is application dependent. Further, the number of DMAs and the ordering of the DMAs in the set of DMAs may be application and system architecture dependent. Except for the final DMA to be performed in the set of DMAs, the triggering of each DMA may be by chaining to a previous DMA and/or by some other event caused by a previous DMA, e.g., the DMA write to the SPI interface that triggers an event that triggers the subsequent DMA reads in the example of FIG. 3. The last DMA to be executed in this set of DMAs is chained to the next-to-last DMA in the set so that it will be triggered by the completion of the next-to-last DMA. Upon completion of the next-to-last DMA, the last DMA is triggered and executed 504 to perform a write to acknowledge completion of the DMA event processing. This acknowledgment allows a new DMA event to be signaled.

Other Embodiments

While the disclosure has been described with respect to a limited number of embodiments, those skilled in the art, having benefit of this disclosure, will appreciate that other embodiments can be devised which do not depart from the scope of the disclosure as disclosed herein.

For example, embodiments have been described herein in which a synchronization signal is read in response to the DMA event as well as a data sample. One of ordinary skill in the art will understand embodiments in which a synchronization signal is not read as part of the DMA set executed in response to a DMA event.

In another example, embodiments have been described herein in which the data samples are read via an SPI interface. One of ordinary skill in the art will understand embodiments in which another type of interface is used to read the data samples, such as, for example, a UART, a multi-channel buffered serial port (McBSP), an McASP, an I2C bus interface, or a peripheral component interconnect (PCI) bus.

In another example, embodiments have been described herein in which one data sample is read for each DMA event. One of ordinary skill in the art will understand embodiments in which more than one data sample is read for a DMA event.

In another example, embodiments have been described herein using a spectroscopy development platform as an example system. One of ordinary skill in the art will understand that the DMA based real-time data acquisition described herein can be used in other applications performing data acquisition such as audio streaming, data acquisition form a digital camera or CCD array), or any type of sensor streaming, e.g., acquiring sensor data to monitor temperature, humidity, and/or other environmental conditions in an industrial setting.

In another example, embodiments have been described herein in which a GPIO interface is used to signal the DMA event. One of ordinary skill in the art will understand embodiments in which other peripheral interfaces are used to signal a DMA event that require that the event be acknowledged so that that data is not over-written before it can be read. Examples of such peripheral interfaces include USB and I2C.

Certain terms are used throughout the description and the claims to refer to particular system components. As one skilled in the art will appreciate, components in radar systems may be referred to by different names and/or may be combined in ways not shown herein without departing from the described functionality. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" and derivatives thereof are intended to mean an indirect, direct, optical, and/or wireless electrical connection. Thus, if a first device couples to a second device, that connection may be through a direct electrical connection, through an indirect electrical connection via other devices and connections, through an optical electrical connection, and/or through a wireless electrical connection, for example.

It is therefore contemplated that the appended claims will cover any such modifications of the embodiments as fall within the true scope of the disclosure.

What is claimed is:

1. A method comprising:
   in a direct memory access DMA controller of a processing component, receiving a fixed rate series of data ready signals from a peripheral device, including at least first and second data ready signals;
   generating a first DMA event signal responsive to the first data ready signal;
   responsive to the first DMA event signal, executing a first set of DMAs to: read and store at least one first data sample from the peripheral device without interrupting the processing component and without software intervention; and read a synchronization signal;
   after completion of reading from the peripheral device by the first set of DMAs, generating a second DMA event signal responsive to the second data ready signal;
   responsive to the second DMA event signal, executing a second set of DMAs to: read and store at least one second data sample from the peripheral device without interrupting the processing component and without software intervention; and read the synchronization signal;
   each of the first and second sets of DMAs including its own respective set of first, next-to-last and last DMAs, the last DMA being chained to the next-to-last DMA, so completion of the next-to-last DMA automatically triggers the last DMA to perform a write operation for indicating completion of reading from the peripheral device by that set of DMAs; and
   responsive to a state change of the synchronization signal, interrupting the processing component to signal that the stored data samples are ready for processing by the processing component.

2. The method of claim 1, wherein the synchronization signal is received at a peripheral interface of the processing component.

3. The method of claim 1, wherein the fixed rate series of data ready signals is received at a peripheral interface of the processing component.

4. The method of claim 1, wherein the first and second data samples are read from the peripheral device via a serial peripheral interface (SPI) of the processing component.

5. The method of claim 1, wherein the peripheral device is an analog-to-digital converter (ADC).

6. The method of claim 5, wherein the first and second data samples are output by the ADC responsive to its conversion of analog voltage samples.

7. The method of claim 6, wherein the ADC receives the analog voltage samples from a detector, and the analog voltage samples correspond to light patterns detected by the detector.

8. The method of claim 7, wherein the light patterns are reflected by a digital micromirror device (DMD), and the detector detects the reflected light patterns.

9. The method of claim 8, wherein the light patterns are reflected by the DMD scanning an object.

10. The method of claim 8, wherein the synchronization signal is from a DMD controller.

11. The method of claim 8, wherein the synchronization signal is for synchronizing a particular reflected light pattern with its corresponding data samples from the ADC.

12. A system comprising:
a peripheral device; and
a processing component, including a direct memory access (DMA) controller coupled to: receive a fixed rate series of data ready signals from the peripheral device, including at least first and second data ready signals; generate a first DMA event signal responsive to the first data ready signal; responsive to the first DMA event signal, execute a first set of DMAs to read and store at least one first data sample from the peripheral device without interrupting the processing component and without software intervention, and to read a synchronization signal; after completion of reading from the peripheral device by the first set of DMAs, generate a second DMA event signal responsive to the second data ready signal; responsive to the second DMA event signal, execute a second set of DMAs to read and store at least one second data sample from the peripheral device without interrupting the processing component and without software intervention, and to read the synchronization signal;
each of the first and second sets of DMAs including its own respective set of first, next-to-last and last DMAs, the last DMA being chained to the next-to-last DMA, so completion of the next-to-last DMA automatically triggers the last DMA to perform a write operation for indicating completion of reading from the peripheral device by that set of DMAs; and
the DMA controller being coupled to interrupt the processing component to signal that the stored data samples are ready for processing by the processing component, responsive to a state change of the synchronization signal.

13. The system of claim 12, wherein the processing component includes a peripheral interface coupled to receive the synchronization signal.

14. The system of claim 12, wherein the processing component includes a peripheral interface coupled to receive the first and second data samples from the peripheral device, and the DMAs are coupled to read the first and second data samples from the peripheral device via the peripheral interface.

15. The system of claim 14, wherein the peripheral interface is a serial peripheral interface (SPI).

16. The system of claim 12, wherein the processing component includes a peripheral interface coupled to receive the fixed rate series of data ready signals.

17. The system of claim 12, wherein the peripheral device is an analog-to-digital converter (ADC).

18. The system of claim 17, wherein the ADC is coupled to output the first and second data samples, responsive to its conversion of analog voltage samples.

19. The system of claim 18, further comprising:
a detector to detect light patterns, and to output the analog voltage samples corresponding to the detected light patterns, wherein the ADC is coupled to receive the analog voltage samples from the detector.

20. The system of claim 19, further comprising:
a digital micromirror device (DMD) to reflect the light patterns, wherein the detector is positioned to detect the reflected light patterns.

21. The system of claim 20, wherein the DMD is positioned to reflect the light patterns by the DMD scanning an object.

22. The system of claim 20, further comprising:
a DMD controller to generate and output the synchronization signal, wherein the DMA controller is coupled to receive the synchronization signal from the DMD controller.

23. The system of claim 20, wherein the synchronization signal is for synchronizing a particular reflected light pattern with its corresponding data samples from the ADC.

24. A system comprising:
a digital micromirror device (DMD) to reflect light patterns;
a detector positioned to detect the reflected light patterns, and to output analog voltage samples corresponding thereto;
an analog-to-digital converter (ADC) coupled to: receive the analog voltage samples from the detector; convert the analog voltage samples into data samples; output the data samples; and generate and output a fixed rate series of data ready signals;
a DMD controller to generate and output a synchronization signal for synchronizing a particular reflected light pattern with its corresponding data samples from the ADC; and
a processing component, including a direct memory access (DMA) controller coupled to: receive the fixed rate series of data ready signals from the ADC, including at least first and second data ready signals; generate a first DMA event signal responsive to the first data ready signal; responsive to the first DMA event signal, execute a first set of DMAs to read and store at least one first data sample from the ADC without interrupting the processing component and without software intervention, and to read the synchronization signal from the DMD controller; after completion of reading from the ADC by the first set of DMAs, generate a second DMA event signal responsive to the second data ready signal; responsive to the second DMA event signal, execute a second set of DMAs to read and store at least one second data sample from the ADC without interrupting the processing component and without software intervention, and to read the synchronization signal from the DMD controller;
each of the first and second sets of DMAs including its own respective set of first, next-to-last and last DMAs, the last DMA being chained to the next-to-last DMA, so completion of the next-to-last DMA automatically triggers the last DMA to perform a write operation for indicating completion of reading from the ADC by that set of DMAs; and
the DMA controller being coupled to interrupt the processing component to signal that the stored data samples are ready for processing by the processing component, responsive to a state change of the synchronization signal.

25. The system of claim 24, wherein the DMD is positioned to reflect the light patterns by the DMD scanning an object.

* * * * *